United States Patent
Reschke et al.

[11] 3,911,765
[45] Oct. 14, 1975

[54] SKI LIFT BULLWHEEL
[75] Inventors: Erwin A. Reschke; Robert Heron, both of Denver, Colo.
[73] Assignee: Heron-Poma Company, Denver, Colo.
[22] Filed: Oct. 26, 1970
[21] Appl. No.: 83,760

[52] U.S. Cl. .................................. 74/801; 104/173
[51] Int. Cl.² ...................... F16H 1/32; B61B 11/00
[58] Field of Search .................... 74/801; 254/175.7; 104/173; 188/82.1, 82.7

[56] References Cited
UNITED STATES PATENTS

| | | | |
|---|---|---|---|
| 309,477 | 12/1884 | Luther | 74/801 X |
| 1,467,939 | 9/1923 | Knap | 74/801 |
| 1,882,383 | 10/1932 | Hallitt | 74/801 X |
| 1,925,023 | 8/1933 | Mercier | 188/82.7 |
| 2,274,281 | 2/1942 | Stinson | 188/82.7 |
| 2,285,636 | 6/1942 | Wallace | 104/173 |
| 2,363,093 | 11/1944 | Sprake | 74/801 X |
| 2,529,330 | 11/1950 | Double | 74/801 |
| 2,941,628 | 6/1960 | McCloskey | 188/82.7 |
| 3,171,294 | 3/1965 | Mazzarins | 74/801 X |
| 3,265,362 | 8/1966 | Moody | 74/801 X |

Primary Examiner—Samuel Scott
Assistant Examiner—John O. Reep
Attorney, Agent, or Firm—Sheridan, Ross & Fields

[57] ABSTRACT

Ski lift cable bullwheel characterized by a hub containing a planetary gear speed reducer. A brake drum for arresting motion of the bullwheel is affixed to the hub. In the illustrated and preferred arrangement of parts, the planetary gearing is disposed in the upper portion of the hub and the brake drum is disposed adjacent the lower end thereof. A conventional speed reducer is preferably employed between the planetary speed reducer and the drive motor to effect speed reduction and torque gain to the bullwheel in two discrete stages.

1 Claim, 3 Drawing Figures

SKI LIFT BULLWHEEL

BACKGROUND OF THE INVENTION

In the art of conveying skiers up slopes it is common practice to provide a rotatable sheave at the lower and upper terminals about which an endless member, such as a cable, is trained and to which is attached, at spaced points therealong, chairs, towbars, or the like which convey the skiers. The sheave at one terminal, sometimes referred to as a bullwheel, is power driven and the sheave at the other terminal is an idler, one of the sheaves being suitably tensioned to maintain the desired tension in the cable runs.

The drive sheave may be power driven in various manners, a conventional arrangement being a rotatable shaft which carries the bullwheel, a reducation gearbox coupled to the bullwheel, and an electric motor coupled to the reduction gearbox. With this construction, the entire reduction ratio occurs in the gearbox, the output shaft of which is directly connected to the bullwheel driveshaft. U.S. Pat. No. 3,257,965 exemplifies such construction. U.S. Pat. No. 2,285,636 exemplifies another form of speed reducer wherein the bullwheel is provided with a large internal gear, driven by a small pinion. The former construction has a disadvantage in that the entire torque required by the bullwheel must be transmitted by the reduction gearbox output shaft, thus necessitating a large output shaft, together with suitable gearing to obtain the entire speed reduction between the drive motor and output shaft. The latter construction obviates such disadvantage to some extent in that the pinion drive shaft may be relatively small since its torque, relative to the bullwheel torque, is reduced in the same ratio as the reduction ratio. A disadvantage, however, resides in the use of a large bullwheel drive gear, together with the relatively small tooth contact area between same and the pinion which also produces undesired angular forces on the shafts due to the pressure angle of the gear teeth.

SUMMARY OF THE INVENTION

The present invention is characterized by a speed reduction arrangement in which a first conventional speed reducing gearbox is employed which is connected to a second speed reducer which is incorporated in the hub of the bullwheel. Since the first speed reducing gearbox transmits only a portion of the entire reduction ratio, it will be apparent that it may be considerably smaller and less expensive than a gearbox which transmits the entire speed reduction. The second and tandem speed reducer within the bullwheel hub is of the epicyclic or planetary type which has certain advantages. For example, and as is well known in the planetary gear art, the tooth pressures on the teeth are reduced in direct proportion to the number of planetary gears employed. Thus, if say three planetary gears are employed, the tooth pressures between the central drive pinion and the planetary gears is only one third the value of an arrangement in which a pinion engages a gear at a single locus. Additionally, the angular forces on the gear teeth are substantially balanced thus substantially eliminating angular forces on the drive and driven members which normally result from the pressure angle force which occurs with single locus tooth contact. Additionally, the reduction ratio within a predetermined space is greater than in a conventional non-planetary type of gearing.

One of the principal objects of the invention is, accordingly, the provision of a ski lift bullwheel which incorporates a hub with a planetary final speed reducer unit therein, this unit being driven by a conventional speed reducer, the latter being smaller and transmitting lesser torque to its output shaft, as compared to a single reduction unit in which the entire speed reduction occurs.

Another object is to incorporate a friction brake within the bullwheel hub.

Further objects, advantages and salient features will become more apparent from the detailed description to follow, the appended claims and the accompanying drawing.

DESCRIPTION OF PREFERRED EMBODIMENT

Figure 2:
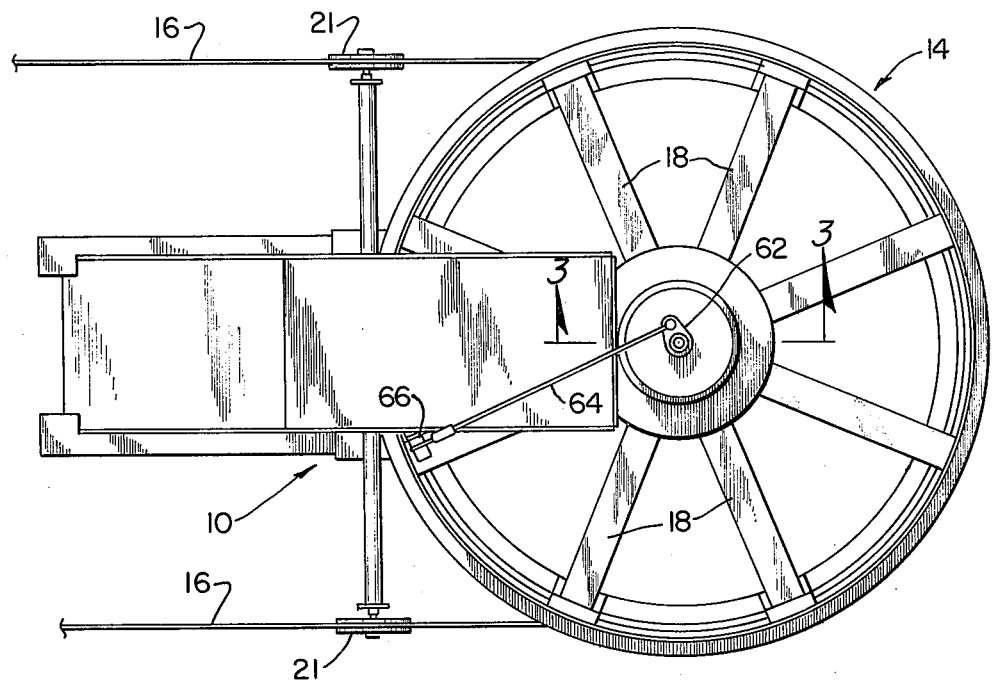
FIG. 2 is a top elevation of same.
Figure 1:
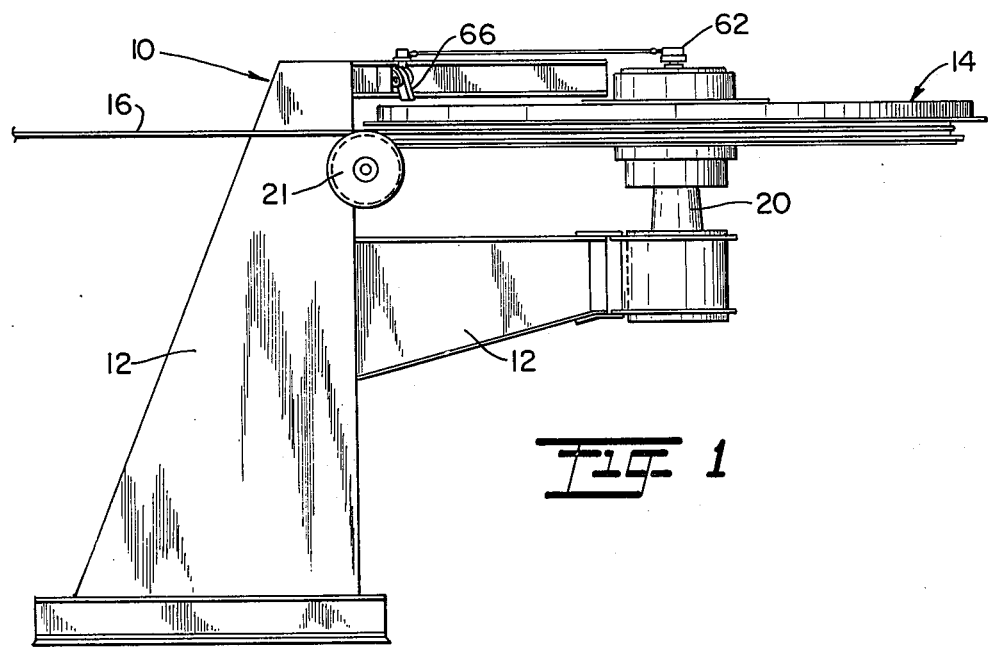
FIG. 1 is a side elevation of the subject of the invention.

Referring first to FIGS. 1 and 2, ski lift terminal support 10 comprises a suitable frame 12 on which a power driven sheave or bullwheel 14 is journaled and about which an endless cable 16 is trained, the two runs of the cable being trained around a conventional tensioned idler sheave (not shown), disposed at the other terminal of the ski lift. Conventional idler sheaves 21 are employed to suitably guide the cable and as will be understood, conventional chairs, tow bars, or the like (not shown) are affixed to the cable at spaced points therealong which carry or tow the skier up a slope between the lower and upper terminals.

Figure 3:
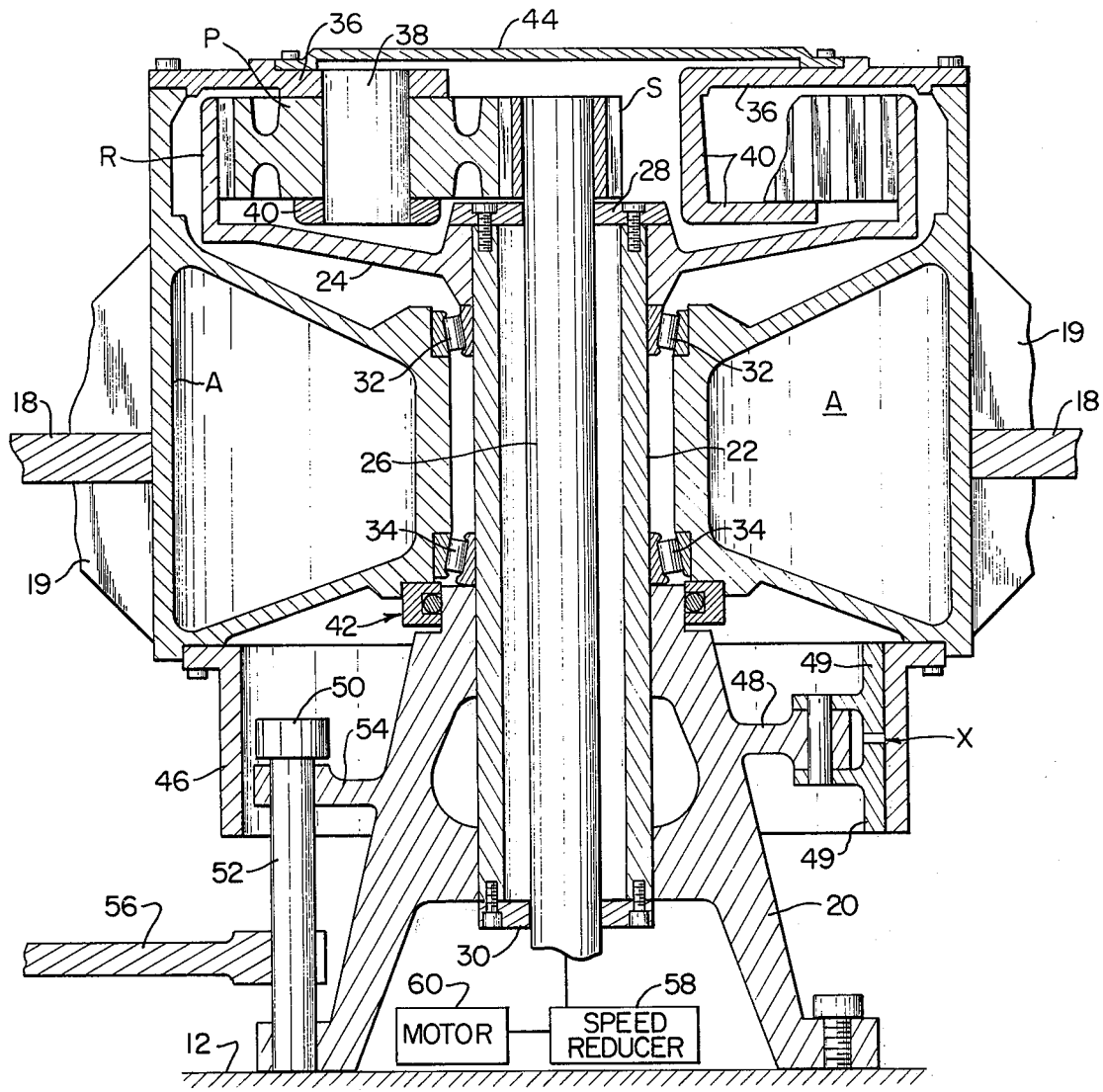
FIG. 3 is a vertical section taken on line 3—3, FIG. 2.

Referring now to FIG. 3, the rim of the bullwheel is connected by a plurality of angularly spaced spokes 18 and gusset plates 19 to a central hollow hub or driven member A which contains the final speed reduction gearing previously referred to. Briefly, this comprises an internal stationary gear R, planet gears P journaled to and carried by hub A, and central driving sun gear S.

As set forth in textbooks on epicyclic gearing or "machinery's handbook" on such subject the revolutions of A for this arrangement is:

$$A = \frac{S}{R+S}$$

where $S$ and $R$ represent pitch diameters or number of teeth on same. In the example illustrated this ratio is approximately 7:1.

In further detail, a support or pedestal 20 is rigidly affixed to frame 12 to which is secured a tube 22 and to the upper end of which is affixed, such as by a spline, key or the like (not shown), internal gear R the rim and teeth of which are affixed to a dished disc 24. While these are illustrated as integral, the rim and teeth may be a separate member to better facilitate cutting the teeth and which may be affixed to the disc in any suitable manner. Sun gear S is affixed to the upper end of drive shaft 26, which may be journaled within tube 22 by any suitable bearings (not shown). Oil seals 28, 30 are disposed adjacent opposite ends of tube 22.

Hub member A is journaled on tube 22 by a pair of tapered roller bearings 32, 34 and a planet gear carrier 36 is secured to the upper end of the hub member. A plurality of equiangularly spaced planet gear journal pins 38 are carried by the carrier 36 which is preferably constructed with L-shaped supports 40 for supporting the lower ends of the pins 38. The number of planet gears is a matter of choice; however, at least three will normally be preferred since the pressure angle forces are better balanced with three or more. As will be apparent, the maximum number possible is limited to the annular space available between the sun and internal gear.

An oil seal 42 is disposed below lower bearing 34 and the space thereabove to a level adjacent the top of the gearing is filled with a lubricant, such as oil. A removable cover 44 is secured to the top of the carrier which provides access to the gearing for inspection or adding lubricant. While the planet gears are illustrated as being journaled on plain bearings to simplify the disclosure, an operative embodiment employs roller bearings between pins 38 and the bores of the planet gears.

A brake drum 46 is preferably secured to the bottom of hub A and a boss 48 pivotally supports adjacent ends of a pair of expandable brake shoes 49. Their other ends are expanded by a cam 50 secured to a shaft 52, journaled in a boss 54 and in the base portion of support 20 to which a suitable actuating lever 56 is secured. Details of the brake have been omitted since such brakes are commercially available, such as supplied by the Catepillar Tractor Company. The more important feature is the use of a rotatable brake member or surface, such as a drum, with its particular relation to the hub, rather than the specific brake shoe construction, which may be varied as desired.

As previously alluded to, shaft 26 is connected to a conventional speed reducer 58 which is driven by a motor 60, shown diagrammatically in FIG. 3.

As will now be apparent, the torque on the various parts of the drive train increases as the speed decreases. This is attained in two discrete stages, first through speed reducer 58 and finally through the speed reducer disposed in the bullwheel hub. The first speed reduction may thus be attained with a conventional speed reducer having a lower torque gain and the final torque gain may be attained in the bullwheel hub with a relatively compact speed reducer which occupies an available space within the bullwheel.

The braking mechanism previously described is normally operated when power from motor 60 is discontinued, thus arresting motion of cable 16. To prevent retrograde motion of the cable under such condition, and in event of brake failure, a safety device is preferably employed which comprises an arm 62 connected to the upper end of hub A by a conventional overrunning or one way clutch (not shown). Arm 62 is connected to a pivoted latch 66 by a link 64, the free end of the latch adapted to be moved into the path of spokes 18. In the operation of this device the clutch overrides so long as the cable is operating in its lifting direction. If, however, for any reason, the cable starts to move in the opposite direction, the clutch engages arm 62 and moves latch 66 into the path of a spoke, positively arresting further retrograde movement of the bullwheel.

What is claimed is:

1. A ski-lift of the type comprising:
    a rotatable sheave disposed at each terminal end thereof at different elevations relative to a ski slope,
    an endless cable trained about the sheaves, forming two substantially parallel cable runs,
    one sheave being an idler and the other being a driving bullwheel,
    said bullwheel having a central hollow hub and a concentric cable engaging rim secured thereto,
    a hollow central stationary support within the hub upon which the hub is supported for rotation about a substantially vertical axis,
    a drive shaft disposed within the support for rotation about said axis,
    said shaft having a driving pinion disposed at the upper end thereof,
    an internal gear, of a pitch diameter considerably in excess of that of the pinion, disposed within the upper end of said hub,
    at least one rotatable gear disposed between the pinion and internal gear, meshing with both,
    a rotary power source connected to the lower end of said shaft,
    said pinion, rotatable gear, and internal gear being operatively connected to said hub and so constructed and arranged to rotate said hub and bullwheel at an angular speed less than said pinion,
    a pair of idler sheaves, one for each cable run, rotatable about axes transverse to the bullwheel axis, so arranged relative to the bullwheel to guide and maintain the cable portion extending around the periphery of the bullwheel in the plane thereof,
    a rotary braking member carried by the lower end of the hub, and stationary brake shoe means engageable with said member,
    a safety device adapted to be moved into the path of the bullwheel for blocking retrograde rotation thereof in the event of failure of the brake member, said safety device being moved into the path of the bullwheel in response to retrograde rotation thereof, and
    an overrunning clutch disposed between the bullwheel and safety device.

* * * * *